United States Patent Office 3,498,908
Patented Mar. 3, 1970

3,498,908
SILICONE PRESSURE-DROP ADDITIVE FOR HYDROCRACKING PROCESS
John H. Frankovich, Chicago, Ill., assignor to Sinclair Research, Inc., New York, N.Y., a corporation of Delaware
No Drawing. Filed July 25, 1966, Ser. No. 567,349
Int. Cl. C10g 13/02; B01d 37/02
U.S. Cl. 208—112                                14 Claims

ABSTRACT OF THE DISCLOSURE

The provision of from 1 to 10 parts per million of an oil soluble silicone polymer in the feedstock to a hydrocarbon conversion process employing a reactor containing a fixed bed of microsize catalyst has been found to decrease pressure drop across the reactor by as much as 50%. It is preferred to use a dimethyl silicone polymer having a viscosity of about 75 to 1500 cs. at 210° F.

This invention relates to an improved method for controlling the pressure drop in hydrocarbon fixed bed catalytic conversion reactors. More particularly, the invention concerns the addition of silicone polymers to such hydrocarbon conversion reactors to decrease the pressure drop.

The presence of excessive pressure drop has long been a problem in the operation of hydrocarbon conversion processes employing fixed beds of macrosize catalyst. The processing of heavy oil feedstocks over such catalyst beds generally results in the build up of fine particles in the reactor, for example, catalyst fines, corrosion products, coke, and metal laid down by catalytic and thermal reactions. These deposits tend to increase with time and can lead to excessive pressure drop in the reactor, thereby requiring discontinuance of the processing cycle before catalyst deactivation occurs to an extent necessitating regeneration or replacement. To further aggravate the situation, it has been found that when a recycled hydrocarbon stream is charged to the reactor during the operation of a hydrocarbon conversion process, the pressure drop in the reactor is substantially greater for a given mass velocity than in a process without hydrocarbon recycle.

According to the process of the present invention, it has been discovered that excessive pressure drop in such fixed catalyst bed, hydrocarbon conversion processes can be substantially reduced under given conditions by the addition of an oil soluble silicone polymer to the reactor. Thus, by decreasing the pressure drop, say by as much as about 50% or more, the reactor processing cycle can be substantially extended. In situations where a high pressure drop can be tolerated, the pressure drop reduction can be sacrificed for an increase in the feed rate, thus achieving a higher rate of through-put. When a recycle heavy hydrocarbon stream, e.g. boiling in the gas oil or higher range, is used in the conversion process, the recycle to fresh feed weight ratio is often about 0.2 to 3, preferably about 0.5 to 2 per weight of fresh feed.

The invention can be better understood by considering a typical recycle system encompassed by the process of the present invention. A residual hydrocarbon fresh feed containing an oil-soluble silicone polymer is pumped to an elevated pressure and passed sequentially through two indirect heat exchangers, in the first of which the stream is heated by exchange with overhead from a hot flash drum. In the second exchanger the hydrocarbon feed is further heated by indirect exchange with part of the liquid effluent bottoms product from the same flash drum. The temperature of the hydrocarbon feed is then raised in a fired heater and then the feed is passed to the reactor. The flash drum mentioned above operates at reactor effluent conditions and provides the liquid effluent bottoms stream containing unconverted material which is suitable for recycle. The recycled portion of flash drum effluent bottoms is separated before heat exchange with the feed and is combined with the hot feed from the fired heater. The combined stream is mixed with a hydrogen-containing gas stream and passed downflow through the reactor which contains a fixed bed of catalyst. The two-phase effluent from the reactor is separated in the above-mentioned flash drum into an overhead hot gas stream and the liquid bottom stream which, as described above, is used to heat the fresh feed. The overhead stream, which has given up some of its heat to the fresh feed, is flashed in a drum to give a light liquid product stream and a hydrogen-rich stream. The latter stream is compressed and a portion can be withdrawn from the system. The remainder is mixed with make-up hydrogen from a catalytic reforming, or other hydrogen-producing, process and the combined stream is passed downflow through the reactor as previously described. The light end products present in the recycle stream of the above process cause substantial pressure drop through the reactor. According to the present invention, the addition of an oil-soluble silicone polymer to the hydrocarbon feedstock reduces the pressure drop through the reactor by a significant amount, e.g. about 25%, up to about 50%, or more.

The process of the present invention is applicable to fixed bed hydrocarbon conversion processes which use conversion catalysts such as those conventionally employed in the hydrocracking or other hydroconversion of petroleum oils, e.g., the Group VIII and Group VI–B metals such as nickel molybdate, cobalt molybdate, platinum, etc., on cracking or non-cracking bases or supports such as silica-alumina, alumina, aluminosilicates, etc. These catalyst compositions can be formed into macrosize solid particles, preferably by extrusion, to give a catalyst of good porosity. The macrosize particles often have diameters of about $\frac{1}{32}$ to $\frac{1}{4}$ inch, preferably about $\frac{1}{16}$ to $\frac{1}{8}$ inch and lengths of about $\frac{1}{32}$ inch or $\frac{1}{16}$ inch up to about $\frac{1}{2}$ or 1 inch, or more.

Although the process of the present invention has been described with respect to a pressure drop caused in a residual hydroconversion process using a recycled stream, it is intended to be applicable to any fixed catalyst bed hydrocarbon conversion process where excessive pressure drop develops. Such processes often convert hydrocarbons boiling above the gasoline range into lighter liquid products, e.g. gas oils into gasoline, residual oils into gas oils, gasoline or both, etc., often in the presence of molecular hydrogen. Reaction temperatures are usually elevated, such as about 500 to 1000° F. and reaction pressures may be reduced, atmospheric or elevated. Such conditions are well known in the art.

The oil-soluble silicone polymers which are effective in reducing the pressure drop in the hydrocarbon conversion process of the present invention are of the type often used as anti-foaming agents and include, for instance, silicone polymers ranging in viscosity, in centistokes, from about 75 to 1500 at 250° C. These silicones are described in the art as in U.S. Patents Nos. 2,416,503, 2,416,504 and 2,662,055, herein incorporated by reference. The amount of silicone polymer used in any given process may depend upon the amount of pressure drop experienced, in excess of that normally associated with the particular system. Generally, the addition of silicone polymers in amounts of about 1 to 10 p.p.m. or more, based on the hydrocarbon feed, often up to about 5 p.p.m., has been found to be effective in reducing the excessive pressure drop in hydrocarbon conversion systems.

The invention is further illustrated, but not limited by the following examples:

EXAMPLE I

An asphalt was converted downflow over 1/8" pellets of a commercial cobalt molybdate-aluminum hydrocracking catalysts at 800° F., 1000 p.s.i.g., 3000 s.c.f./bbl. hydrogen rate based on the fresh feed, 0.5 WHSV, and a combined feed ratio (CFR) of 3/1 for a period of 225 hours. The pressure drop through the reactor at this point was measured at 28 inches $H_2O$. Conducting the same process with the addition of 5 p.p.m. of dimethyl silicone polymer having a viscosity of 200 cs. at 210° F. resulted in a pressure drop of only about 16 inches $H_2O$, a reduction in pressure drop of about 40%.

EXAMPLE II

After an additional 50 hours of operation in the same system as Example I, and at the same conditions, a feedstock comprising a blend of fresh asphalt and recycled liquid product stream (CFR 3/1) from the 800° F. hydrocracking operation was processed as in Example I but at a temperature of 600° F. with and without the addition to the feedstock of 5 p.p.m. of dimethyl silicone polymer having a viscosity of 200 cs. at 210° F. The pressure drop without the silicone polymer is 35 inches $H_2O$, and with the silicone polymer is 25 inches $H_2O$. Thus, a pressure drop reduction of about 30% was realized.

As can be seen in the examples, the pressure drops were a very small percentage of the total pressure. However, these data were taken in a 3" I.D., 4' pilot plant reactor which is considerably smaller than a commercial reactor. Since velocities and reactor lengths are many times greater in the large scale reactors, the commercial pressure drop can be scaled up from the pilot plant data to an amount which would significantly limit a commercial processing cycle.

It is claimed:

1. A method of decreasing the pressure drop in a hydrocarbon conversion process which converts a hydrocarbon feed in a reactor containing a fixed bed of macrosize solid catalyst and mixed gas-liquid phases, which comprises providing in the conversion reactor when excessive pressure drop occurs, an amount of an oil-soluble silicone polymer sufficient to reduce the pressure drop under given conversion conditions.

2. The method of claim 1 wherein the oil-soluble silicone polymer is present in an amount of about 1 to 10 p.p.m. based on the hydrocarbon feed.

3. The method of claim 2 in which the polymer is a dimethyl silicone having a viscosity of about 75 to 1500 cs. at 210° F.

4. The method of claim 1 in which the hydrocarbon is a residual petroleum hydrocarbon.

5. The method of claim 4 in which liquid product is recycled to the reactor at a ratio of about 0.2 to 3 weights per weight of fresh feed.

6. The method of claim 5 in which molecular hydrogen is fed to the reaction zone and the catalyst is effective in promoting hydrocracking.

7. The method of claim 6 in which the catalyst is cobalt molybdate-alumina.

8. The process of claim 1 in which the hydrocarbon feed boils above the gasoline range and is converted into lighter liquid products.

9. The method of claim 8 in which liquid product is recycled to the reactor at a ratio of about 0.2 to 3 weights per weight of fresh feed.

10. The method of claim 9 in which molecular hydrogen is fed to the reaction zone, the catalyst is effective in promoting hydrocracking, the macrosize catalyst is in particle sizes of about 1/32 to 1/4 inch, and the reaction temperature is about 500 to 1000° F.

11. The method of claim 10 in which the polymer is a dimethyl silicone having a viscosity of about 75 to 1500 cs. at 210° F.

12. The method of claim 11 in which the hydrocarbon is a residual petroleum hydrocarbon.

13. The method of claim 12 wherein the oil-soluble silicone polymer is present in an amount of about 1 to 10 p.p.m. based on the hydrocarbon feed.

14. The method of claim 13 in which the catalyst is cobalt molybdate-alumina.

References Cited

UNITED STATES PATENTS

| | | | |
|---|---|---|---|
| 3,043,769 | 7/1962 | Nathan et al. | 208—112 |
| 3,068,168 | 12/1962 | Anderson et al. | 208—112 XR |
| 3,215,154 | 11/1965 | White et al. | 137—13 |
| 3,324,195 | 6/1967 | HWA et al. | 260—680 |
| 3,313,600 | 4/1967 | Laughlin. | |

DELBERT E. GANTZ, Primary Examiner

G. E. SCHMITKONS, Assistant Examiner

U.S. Cl. X.R.

208—48, 108; 210—65